(12) United States Patent
Ebel et al.

(10) Patent No.: US 6,942,819 B2
(45) Date of Patent: Sep. 13, 2005

(54) CAPACITOR HAVING CORROSION INHIBITOR

(75) Inventors: Thomas Ebel, Milan (IT); Frank Stippich, Neckargemünd (DE); Jürgen Behm, Ulm (DE); Olaf Magnussen, Altenholz (DE); Stefan Lauterborn, Senden (DE)

(73) Assignee: Epcos AG, Munich (DE)

( * ) Notice: Subject to any disclaimer, the term of this patent is extended or adjusted under 35 U.S.C. 154(b) by 0 days.

(21) Appl. No.: 10/258,833

(22) PCT Filed: Mar. 23, 2001

(86) PCT No.: PCT/DE01/01135

§ 371 (c)(1),
(2), (4) Date: Jun. 9, 2003

(87) PCT Pub. No.: WO01/84573

PCT Pub. Date: Nov. 8, 2001

(65) Prior Publication Data

US 2004/0004806 A1 Jan. 8, 2004

(30) Foreign Application Priority Data

Apr. 28, 2000 (DE) .......................................... 100 20 928

(51) Int. Cl.⁷ .............................................. H01G 9/022
(52) U.S. Cl. ...................... 252/62.2; 361/503; 361/504; 361/506
(58) Field of Search .......................... 252/62.2; 361/503, 361/504, 506

(56) References Cited

U.S. PATENT DOCUMENTS 4,469,610 A    9/1984   Fukuda et al.

FOREIGN PATENT DOCUMENTS

| DE | 3 824 447 A1 | 7/1988 |
| DE | 3 734 185 A1 | 4/1989 |
| EP | 0 046 219 | 7/1981 |
| JP | 01168016 | 7/1989 |
| JP | 05152165 | 6/1993 |
| JP | 07211589 | 8/1995 |
| JP | 07-211589 | * 8/1995 |

OTHER PUBLICATIONS

Derwent abstract for JP 7–211589.*

* cited by examiner

*Primary Examiner*—C. Melissa Koslow
(74) *Attorney, Agent, or Firm*—Fish & Richardson P.C.

(57) ABSTRACT

An electrolyte for use with an aluminum electrolyte capacitor includes a glycol/boric acid/borate compound, traces of water, and an inhibitor to suppress corrosion of an aluminum oxide coating of the capacitor. The inhibitor contains a weak organic acid and at least one acid group selected from among carboxylic acid, sulfonic acid, phosphonic acid, and an acidic derivative of carboxylic acid, sulfonic acid, and phosphonic acid.

18 Claims, No Drawings

CAPACITOR HAVING CORROSION INHIBITOR

CROSS-REFERENCE TO RELATED APPLICATIONS

This application claims priority to PCT Application No. PCT/DE01/01135, filed on Mar. 23, 2001, and to German Patent Application No. 100 20 928.9, filed on Apr. 28, 2000.

BACKGROUND

The invention relates to a glycol/boric acid/borate-based operating electrolyte for an aluminum electrolyte capacitor, which contains at least traces of water and an inhibitor that acts as an additive to reduce corrosion of the aluminum oxide coating of the capacitor.

An aluminum electrolyte capacitor contains two aluminum foils as electrodes, between which a separator impregnated with an operating electrolyte is arranged. An oxide coating is applied as a dielectric onto the aluminum foil serving as the anode. A paper is normally used as the separator. The operating electrolyte is selected in such a way as to ensure that it features adequate ion conductivity, adequate temperature stability at least across the operating temperature interval, electrolysis stability at its operating voltage and, in particular, chemical stability, so that decomposition processes taking place during operation of the electrolyte capacitor do not lead to gas exhalation that could jeopardize the tightness of the capacitor.

A number of ethylene glycol-based compounds for use in operating electrolytes are known from U.S. Pat. No. 4,469,610. The conductive salts used in these compounds include boric acid, ammonium borate, long-chain dicarboxylic acids, and salts of long-chain dicarboxylic acids. In known glycol/boric acid/borate-based operating electrolytes, problems occurs in electrolytes containing a high proportion of water. This water develops during esterification of the boric acid with the glycol. This water causes corrosion of dielectric aluminum oxide within the capacitor, especially at higher temperatures within the electrolyte capacitor. This corrosion damages the dielectric and results in gas development in the capacitor.

SUMMARY

To avoid the foregoing disadvantageous effect, corrosion inhibitors are normally added to the operating electrolyte. Corrosion inhibitors are substances that suppress the corrosive action of water on the aluminum oxide coating of the anode foil. Inhibitors include phosphoric acid and salts of phosphoric acids, such as phosphates, phosphonates, and hypophosphites. Other electrolytes do without the glycol/boric acid system in order to eliminate the development of water. However, the glycol/boric acid-based operating electrolyte is preferred, due to the favorable shaping properties of its anodic oxide and its self-extinguishing properties.

The object of this invention, therefore, is to provide, for an operating electrolyte of the type specified above and an inhibitor that suppresses the corrosion resulting from water contained in the operating electrolyte on the electrode foils or the anodic oxide, and that yields a temperature-resistant operating electrolyte that remains stable for long periods of time even at high operating voltages.

According to the invention, the foregoing objects are achieved by an operating electrolyte of the type specified above, with the aid of the characterizing features of Claim 1. Advantageous embodiments of the invention result from the dependent claims.

DETAILED DESCRIPTION

A glycol/boric acid-based electrolyte system and a weak acid with an organic matrix (backbone) were found that provide significantly improved corrosion protection in the electrolyte capacitor. If applicable, the matrix of this acid is unsaturated aliphatic, cycloaliphatic, or aromatic. The acid groups are selected from among carboxylic acid, sulfonic acid, phosphonic acid, or an acidic derivative of the acid groups named.

For reduced corrosive action, it is sufficient that the inhibitor be contained in the operating electrolyte at a ratio of 1 to 20 mmol/kg. It is presumed that the inhibitor forms a sort of protective complex on the aluminum oxide surface, with the above-mentioned amount being sufficient to form a monomolecular coating over the anode foil in the electrolyte capacitor. It should also be noted that in the operating electrolyte of the invention, the protective complex coating the inhibitor forms over the anodic oxide coating does not-lead to a-deterioration of the electrical parameters of the electrolyte capacitor. In other electrolyte systems, corrosion of the anodic oxide of the capacitor was observed with complex-forming substances, with this corrosion leading to the aforementioned reduced electric strength due to the elevated risk of electrical breakdown. The presumed formation of complexes by the inhibitor in the operating electrolyte of the invention leads to a protective effect, and not to a removal or thinning of the oxide.

A further improved protective effect is achieved when the inhibitor features, in addition to the acid group mentioned above, at least one other functional group, which can act as an electrode donor or complex-forming agent and, consequently, encompasses a heteroatom with a free electron pair, an aromatic group, or one of the acid groups already mentioned above. Inhibitors based on amino acids or amino acid derivatives are especially preferred and/or feature especially favorable properties.

Corrosion-resistant or corrosion-suppressing operating electrolytes can also feature an alkyl diphosphonic acid or its derivatives as the inhibitor. Especially suitable as derivatives are the acidic esters of the diphosphonic acid, especially those in which the phosphonic acid group is esterified with alkyl alcohols.

An operating electrolyte of the invention reacts in a slightly acidic manner and has a pH value of between 5 and 8.

A normal composition of an operating-electrolyte of the invention contains approximately 20 to 40 percent in weight of ammonium borate and/or boric acid, dissolved in ethylene glycol. Five to 20 mmol/kg of inhibitor are added to this solution as an additive. Other additives commonly used in operating electrolytes are also possible, such as those used to stabilize the solution.

In the following, the advantageous action of operating electrolytes of the invention will be described in greater detail on the basis of exemplary embodiments.

The following substances are selected as typical examples of inhibitors used in accordance with the invention:

(S)-(+)-glutamic acid
1,12-dodecane-diphosphonic acid
(S)-(+)-glutamine
Toluol-4-sulfonic acid hydrazide
L-arginine
1-hydroxyethane-1,1-diphosphonic acid To test corrosion-protective action, water containing 15 to 20 percent in weight of glycol/water mixtures is combined with 10 mmol/kg of inhibitor substances. The lower water content corresponds to the normal water content of a known glycol/borate-based operating electrolyte. For the higher water content, it is known that an especially strong corrosive effect occurs with respect to the anodic oxide coating. To guarantee a specific water content in the test mixtures that remains constant throughout the entire duration of each test, boric acid or borate is not added to the mixtures. As corrosion tests, hot storage tests were conducted at 85° C. During these tests, anode foil pieces, to which anodic oxide has been applied, are coated with the test solutions and stored at the specified temperature of 85° C. for 8 and 70 hours, respectively. The hot storage is performed in a test cell and, to prevent water evaporation and thereby ensure a constant water content, the ethylene glycol/water mixture is coated with n-pentadecane for the duration of the test.

Subsequently, the tested anode foils are removed from the test solution, rinsed with water, and tested for roughness. Roughness is an indicator of the amount of corrosion on the anode foil. An examination of the surface using a scanning power microscope, known as AFM imaging, is used to determine roughness. The levels of roughness determined by examination are compared with those of an untreated anode foil.

The following table provides the test results for 15% glycol solutions in water with each solution containing 10 mmol/kg of the respective inhibitor.

|  | 8 hours | 70 hours |
|---|---|---|
| Untreated foil | 16.24 | 16.24 |
| Glycol/water 15% | 10.1 | 34.45 |
| (S) – (+) –glutamic acid | 9.47 | 7.11 |
| Toluol-4-sulfonic acid hydrazide | 8.98 | 16.23 |
| L-arginine | 13.26 | 9.72 |
| 1,12-dodecane-diphosphonic acid | 13.29 | 16.59 |
| (S) – (+) –glutamine | 9.33 | 25.25 |
| 1-hydroxyethane-1,1-diphosphonic acid | 23.08 | 16.17 |
| Phosphoric acid | 8.15 | 7.76 |

A test solution not containing an inhibitor is used to provide a reference value for the effectiveness of the tested inhibitors. Roughness is indicated as the mean variance in the height of the measuring needle scanning across the surface, which results from the arithmetic mean of the variance of the needle from its resting position.

In all tested substances of the invention or in all ethylene glycol/water/inhibitor mixtures of the invention, improved corrosion stability and/or reduced corrosion is observed in comparison to the plain glycol/water mixture.

Although more corrosion is observed for some of the tested substances after the longer test period, others already exhibit a stable state after a short period of time, and a state that does not change further, even after the extended test period. It is assumed that corrosion occurs only until a monomolecular protective coating has formed over the anodic oxide coating, and that the coating completely prevents further corrosion in some cases. Nonetheless, an improvement in comparison to the plain glycol/water mixture containing no inhibitor is observed with the specified test substances.

Additional tests show that the values obtained with the test solutions (glycol/water mixtures plus inhibitors) are also transferable to the complete operating electrolyte, so that these tests can also be used to definitively demonstrate the improved corrosion-protective action of operating electrolytes of the invention.

Although the invention has been only described on the basis of a few selected examples of inhibitor substances, the results demonstrate the broad applicability of the substance groups suitable for use as inhibitors that are proposed according to the invention. Consequently, the invention also includes other suitable representatives from the substance groups named, all of which do not have to be listed here.

The operating electrolyte is therefore very well-suited for use in aluminum electrolyte capacitors.

What is claimed is:

1. An electrolyte for use with an aluminum electrolyte capacitor, the electrolyte comprising:
    a compound comprising at least one of glycol, boric acid, and borate;
    a trace of water; and
    an amino acid that acts as an inhibitor to suppress corrosion of an aluminum oxide coating of the aluminum electrolyte capacitor, the amino acid being selected from a group containing arginine, glutamine, and glutamic acid.

2. The electrolyte according to claim 1, wherein the amino acid is contained in the electrolyte at a ratio of 1 to 20 mmol/kg.

3. The electrolyte according to claim 1 having a pH value of between 5 and 8.

4. The electrolyte according to claim 1, comprising 20–40 percent by weight of ammonium borate and 60–80 percent by weight of ethylene glycol, and an additive of 1–20 mmol/kg of inhibitor.

5. An aluminum electrolyte capacitor comprising the electrolyte of claim 1.

6. An electrolyte for use with an aluminum electrolyte capacitor, the electrolyte comprising:
    a compound comprising at least one of glycol, boric acid, and borate;
    a trace of water; and
    a weak organic acid that acts as an inhibitor to suppress corrosion of an aluminum oxide coating of the aluminum electrolyte capacitor, the weak organic acid comprising an acidic ester of an alkyl diphosphonic acid.

7. The electrolyte according to claim 6, wherein the weak organic acid is contained in the electrolyte at a ratio of 1 to 20 mmol/kg.

8. The electrolyte according to claim 6 having a pH value of between 5 and 8.

9. The electrolyte according to claim 6, comprising 20–40 percent by weight of ammonium borate and 60 to 80 percent by weight of ethylene glycol, and an additive of 1–20 mmol/kg of inhibitor.

10. An aluminum electrolyte capacitor comprising the electrolyte of claim 6.

11. The electrolyte of claim 6, wherein the weak organic acid comprises at least one of an unsaturated aliphatic, cycloaliphatic, and an aromatic backbone.

12. An electrolyte for use with an aluminum electrolyte capacitor, the electrolyte comprising:
    a compound comprising at least one of glycol, boric acid, and borate;
    a trace of water; and
    a weak organic acid that acts as an inhibitor to suppress corrosion of an aluminum oxide coating of the aluminum electrolyte capacitor, wherein the weak organic acid comprises an acidic derivative of a sulfonic acid.

13. The electrolyte according to claim 12, wherein the weak organic acid is contained in the electrolyte at a ratio of 1 to 20 mmol/kg.

14. The electrolyte according to claim 12 having a pH value of between 5 and 8.

15. The electrolyte according to claim 12, comprising 20–40 percent by weight of ammonium borate and 60 to 80 percent by weight of ethylene glycol, and an additive of 1–20 mmol/kg of inhibitor.

16. An aluminum electrolyte capacitor comprising the electrolyte of claim 12.

17. The electrolyte of claim 12, wherein the acidic derivative of a sulfonic acid comprises at least one of an unsaturated aliphatic, cycloaliphatic, and an aromatic backbone.

18. The electrolyte of claim 12, wherein the acidic derivative of a sulfonic acid comprises toluene-4-sulfonic acid hydrazide.

* * * * *